Figure 1:
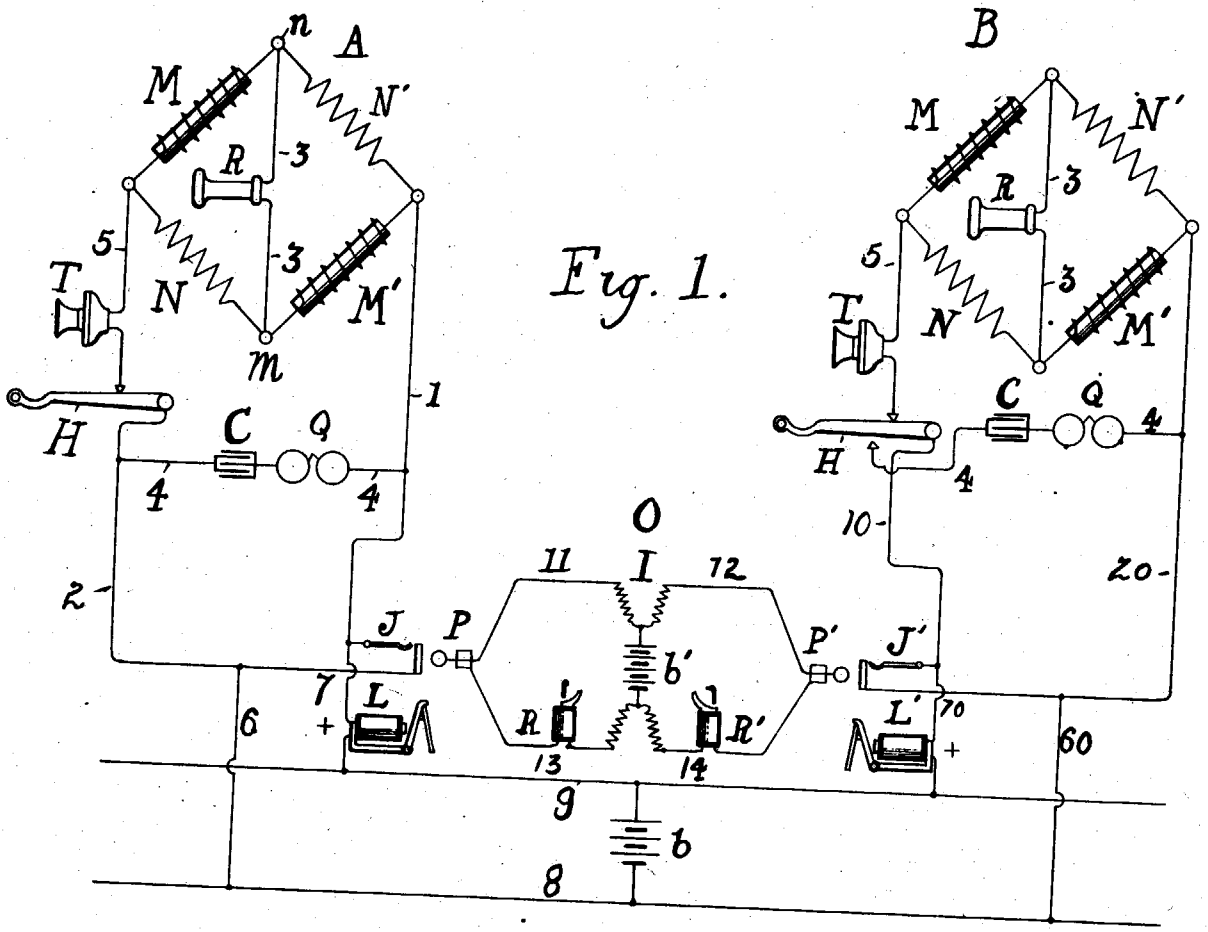

R. H. MANSON.

TELEPHONE SYSTEM.

APPLICATION FILED JULY 1, 1907.

Reissued Mar. 23, 1909.

12,929.

2 SHEETS—SHEET 1.

Witnesses

George E. Higham

Leonard W. Novander

By

Inventor

Ray H. Manson

Charles E. Brown

Attorney

R. H. MANSON.

TELEPHONE SYSTEM.

APPLICATION FILED JULY 1, 1907.

Reissued Mar. 23, 1909.

12,929.

2 SHEETS—SHEET 2.

Witnesses
George E. Higham.
Leonard W. Novander.

By

Inventor
Ray H. Manson
Charles A. Brown
Attorney

UNITED STATES PATENT OFFICE.

RAY H. MANSON, OF ELYRIA, OHIO, ASSIGNOR, BY MESNE ASSIGNMENTS, TO THE DEAN ELECTRIC COMPANY, OF ELYRIA, OHIO, A CORPORATION OF OHIO.

TELEPHONE SYSTEM.

No. 12,929. Specification of Reissued Letters Patent. Reissued Mar. 23, 1909.

Original No. 818,897, dated April 24, 1906, Serial No. 214,111. Application for reissue filed July 1, 1907. Serial No. 381,810.

*To all whom it may concern:*

Be it known that I, RAY H. MANSON, a citizen of the United States, residing at Elyria, in the county of Lorain and State of Ohio, have invented certain new and useful Improvements in Telephone Systems, of which the following is a specification, reference being had therein to the accompanying drawings.

My invention relates to telephone systems, and particularly to such as employ a source or sources of current at a central point to supply substations at other points over the ordinary working lines. While not limited to such use, as will sufficiently appear from the detailed description that follows, I contemplate applying my invention to what are known as "common-battery" telephone-exchange systems, wherein a number of subscribers' stations are served from a central station at which are located suitable switchboards and other appliances to effect connection and disconnection of the lines as desired, together with power appliances to generate and distribute the current required for all purposes in the system or at any of the substations. In such systems it is common to employ telegraphic or other signals to indicate a desire for connection or disconnection as between the subscribers and the operators and other similar signals as between operators, and such signals are conveniently energized to be displayed and to be retired in the use of various pieces of the operators' apparatus, being controlled in part, as stated, by the subscriber in the use of his apparatus. For the control of such signals with certainty and facility direct current is employed almost exclusively, constantly flowing in one condition and entirely stopped in another condition. Thus subscribers' lines in their normal or idle condition are ordinarily open for the passage of direct current, and no current passing therein the signals at central corresponding to such lines remain quiescent or concealed. In preparing to converse, the subscriber produces certain changes or movements of the parts of his apparatus which result in closing his line for direct current, which commences to flow therein, and thereby to energize the signal or signals corresponding thereto at the central office. Upon perceiving these signals the operator or operators concerned answer the call or calls, and the subsequent steps of putting up a pair of plugs, ringing, &c., follow in regular sequence, the line or calling signals remaining restored or quiescent during the continuance of the connection. It should be noted, however, that current continues to flow in the subscribers' lines during the connection, and the retirement of the line-signals, if they are retired, is in no wise dependent on the cessation of such flow. The current flows for two reasons—first, to supply energy for the subscribers' transmitters for talking purposes, and, second, to enable the subscribers to control the disconnection or "supervisory" signals placed in the connecting cord-circuits. It is true that the latter signals could be operated perhaps by a restarting of current-flow if the same was stopped upon the answer to a call being made; but there is more certainty as well as more convenience in permitting a constant flow once it is started, particularly as it reduces the apparatus for current control at the substation to a plainswitch, with contacts to open and close the line-circuit.

At the subscribers' stations apparatus is provided for both talking and signaling. The signaling apparatus is necessarily of twofold function—signal-sending and signal-receiving. The former function is accomplished usually by the hook-lever supporting the receiver when in disuse, which normally breaks the line-circuit so far as direct current is concerned, but rises upon taking down the receiver to close the circuit. The second function is performed by a bell, usually polarized, normally included in a bridge connection across the line, a device being also included in said bridge to permit the passage of alternating current, but not of direct, such as a condenser or polarization cell or coherer.

With such apparatus at the substation it is apparent that under conditions of disuse no current from any direct or continuous source will flow in the line; but alternating current may be sent from central to operate the bell and call the subscriber. On the other hand, when the subscriber takes his telephone for conversation the hook-lever rises, the circuit is closed to central for direct current, and the signals at central get energy sufficient to set them, while at the same time the current flow through the substation apparatus furnishes energy for the talking set. During the entire connection or use of the line the current continues to flow through the telephone at the substation, and it is with the circuits and apparatus through which this current is led that my invention has especially to do.

Several ways have heretofore been followed in connecting up the talking apparatus and signals at the substation. According to one plan the transmitter and receiver when cut in are directly in the line in series with each other, and the other apparatus in line. By another plan the receiver is included in a local circuit connected to the line through an induction-coil. A third plan connects the transmitter with an impedance-coil in series in the line and the receiver with a condenser in a shunt around the coil. I will refer to these plans in succession and point out the most salient defects acknowledged to exist therein and then refer to the means I have adopted to avoid these defects.

According to the first plan all the current delivered to the transmitter and to the signal devices at central passes through the windings of the receiver. If reversely connected, this tends to depolarize the receiver, and in any case it brings a strong tension on the diaphragm, tending to buckle it and so destroy the efficiency of the receiver.

According to the second plan there is a loss of efficiency of nearly thirty per cent. average in the transformer or induction-coil. It has been claimed that the loss can be reduced to twelve per cent. in some cases; but even so, this is a great loss, especially in view of the fact that the telephone at its best is not an efficient translating device, and the central energy telephone is not the best exponent of the class, there being line losses and exaggerated ratios of change to take into account where it is employed.

According to the last plan mentioned the condenser is indispensable as an adjunct in the talking-circuit. While the loss in efficiency due to the inclusion of the condenser is not so high as that due to the inclusion of a coil, still its presence is undesirable for many reasons. In point of efficiency of transmission this plan probably gives better service than any of the others I have mentioned above, but not as good as that attainable by my new method.

In order to avoid the defects noted, I follow the procedure now to be stated. The transmitter is most efficient included directly in the line, particularly where it has its normal steady current-supply fed through a source of inductance, so that when waves are set up they will be sharpened and strengthened by the discharge from the coil and by its damming effects. Hence I put my transmitter in the line and feed it through a coil, having, preferably, many turns on an iron core, providing an alternative path for voice currents or waves around this coil. The receiver must not be exposed to differences of potential except those due to the talking instruments. Hence I put my receiver in a bridge connection so devised that the opposite terminals of the bridge-wire will be at the same potential for all continuous electromotive forces and so the receiver will not be exposed to the passage of continuous current. I arrange the coil I have already referred to, however, so that alternating currents of high frequency—such as "voice currents," so called—will pass practically in their entirety through the bridge-wire and hence through the receiver.

No condenser and no induction-coil or other energy-absorbing piece of apparatus is included in my circuit, while for direct currents a higher efficiency than usual is obviously attained, inasmuch as the resistance in the receiver branch is halved without in any way affecting the receiver efficiency or resistance. (By receiver branch in this connection I mean the entire arrangement of receiver-circuit, not merely the bridge-wire.)

To put the matter more specifically, I employ a Wheatstone bridge in series with the transmitter in the line-circuit over which the transmitter-current flows, the receiver being located in the bridge-wire proper. The resistances of the four arms of the bridge are so proportioned with respect to each other that, although steady current flowing over the line will pass through them freely, no current will pass through the bridge-wire containing the receiver. This means that I employ a Wheatstone bridge adjusted to a state of balance with respect to direct currents, such currents being excluded from the receiver not because the receiver-circuit is in any sense opaque to such direct currents, but because there is no difference of potential between the terminals of the receiver-circuit, and therefore no tendency for current to flow through the receiver.

It will be seen that the method which I employ for preventing a flow of steady current through the receiver is wholly distinct from any method based on insulation, opposition, or obstruction, for in my arrangement steady current could flow if a cause existed, but will no more flow, due to the balance of the bridge, than if the receiver terminals were truly short-circuited.

In order that fluctuating currents may not for the same reason be caused to pass by rather than through the receiver circuit, I make the diagonally opposite arms of the Wheatstone bridge possess in large degree the property of self-induction, thereby giving to these two arms comparatively a very high impedance to fluctuating currents. It is evident, therefore, that the same conditions that hold with respect to steady currents do not hold with respect to fluctuating currents. In other words, the bridge is balanced with respect to steady currents and entirely out of balance with respect to fluctuating currents, with the result that fluctuating currents choose the comparatively low impedance path through the receiver rather than the comparatively high-impedance path through the two arms of the bridge that possess self-induction. By these means I achieve the desirable result of excluding direct current from the receiver without employing any medium opaque to direct currents in the receiver circuit, and at the same time I force practically all fluctuating currents through the receiver-path. In addition to this there are certain details of arrangement incident to the main features of invention, which will sufficiently appear from the following description, such as the method and form of winding and of connection of the coil or coils employed.

My invention is illustrated in the accompanying drawings, wherein the same letters and figures of reference point out the same parts throughout.

Figure 2:
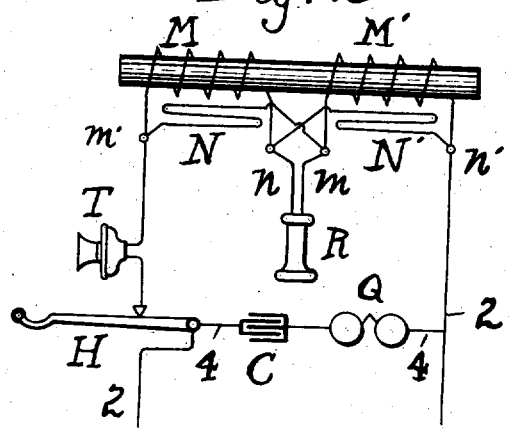

In the drawings, Figure 1 is a diagram of a common-battery telephone-exchange system embodying my invention. Fig. 2 is a diagram showing the method of winding the coils.

Referring to Fig. 1, A and B are two subscribers' stations connected to the central office O by line-wires 1 2 and 10 20, respectively The line 1 2 passes to the bus-wires 9 and 8 of the main battery *b* by wires 7 and 6, in the former of which a polarized signal L is shown connected. For purposes of connecting with other lines the spring-jack J is provided, having a spring and a sleeve forming terminals of the wires 1 and 2. Similarly, line-wires 10 and 20 pass to the bus-wires 9 and 8 by wires 70 and 60, the former having intercalated therein the polar signal-magnet L′. Spring-jack J′ is provided, having its spring end sleeve to line-wires 10 and 20 respectively.

Each operator is provided with a number of cord-circuits for interconnecting subscribers' lines, one of which only is shown at 11 12 13 14, having terminal plugs P and P′, adapted to coöperate with the jacks J and J′. Across this cord-circuit I have shown a battery *b′* bridged between the two halves of a repeating-coil I, so as to feed both ways through the cord and plugs to the lines in use. In the cord conductors 13 and 14 I have shown supervisory or clearing-out signal-magnets R and R′ interposed, so that current passing to the lines will traverse the windings thereof. These are supposed to be constant-current signals—that is, such as display or are indicated in one condition as long as current flows in the circuits, but have their condition or indication changed upon cessation of current.

As the apparatus and circuits at the two substations shown have some variations in one station over the other, I will now first describe those at station A and then turn to station B. At station A the line-wire 2 passes to the hook-lever H, which is normally in position to be separated from its contact, shown touching it. This contact is connected to the transmitter T and the latter by wire 5 to one end point of the receiver-bridge. From this point two arms extend to points *m n*, between which the receiver R is connected in the cross-wire 3. From points *m* and *n* two other arms extend to a second point of union, where they are connected together to the wire 1 of line. Between wire 5 and point *n* and between point *m* and wire 1 two coils are connected, preferably having many turns of wire wound on soft-iron cores in such manner as to offer considerable impedance to alternating currents of the frequency of speech-currents. In the other two arms of the bridge from 5 to *m* and from *n* to 1 I connect two non-inductive resistances of such magnitude that the usual bridge equation is satisfied, or $\frac{M}{N}=\frac{N'}{M'}$. With this relation of coils it is evident that for direct currents there will be no current-flow in the bridge-wire 3 normally.

For receiving signals at the substation A, I provide the polarized bell Q, connected in a permanently-closed bridge 4 across the line-wires 1 2, the bridge 4 including a condenser C, which serves to render it impassable for direct current if continuous. Turning now to station B, line-wire 10 passes to the hook-lever H, and so normally to a lower contact upon which it rests, thence by wire 4 and condenser C to the bell Q, and so to wire 20. When the hook-lever H is up during the use of the telephone, this path is broken and the wire 10 is connected by wire 5 to the extremity of a bridge similar to that at station A, having the same arrangement of coils and resistances, and the receiver R also included in the bridge-wire 3.

The operation of the devices so far described is as follows: Suppose subscriber A calling for a connection with subscriber B. He raises his receiver from the hook of the lever H, which thereupon rises to close upon its up-contact. Current then flows from the battery *b* at central through line-wire 1 by way of bus 9 and signal L to the substation, there through paths N′ *n* M and M′ *m* N in parallel, through wire 5 to transmitter T, to hook-lever H, and by wire 2 and wire 6 back to bus 8 and battery. This current energizes and causes the display of the line-signal L, observing which the operator inserts plug P in the jack J and by means of a listening key (not shown) obtains the number wanted. Having tested the line wanted in any suitable way, (by means also not shown,) if the board be a multiple board and finding the line wanted to be idle she inserts the plug P′ in jack J′ and proceeds to ring up station B by means of a ringing-key connecting a suitable generator to line. Alternating ringing current passes over line-wire 10 to bridge 4 and through the bell Q. The subscriber B answers by taking down his receiver, whereupon the fact is announced to the operator by the signal R′ in the cord. Current from battery *b*′ now flows to both substations A and B through the cord, the line-signals being restored to inaction by reversal or neutralization of current in their coils due to the opposition of batteries *b* and *b*′. At station B this current passes through the transmitter and the two sides of the bridge without affecting the receiver, as before stated. It will be observed that by this arrangement the receiver can be made of any desired resistance without affecting the main current-flow in the slightest degree. The resistance of the coils M M′ and resistances N N′ is halved, as they are in parallel paths, while the coils M and M′ are in series for their inductive effects, giving maximum efficiency for this purpose. When the subscribers have finished their conversation, they simply hang up their receivers, when current is at once cut off from signals R and R′, the change in whose condition attracts the attention of the operator and leads to the withdrawal of plugs P and P′ and the restoration of all parts to normal position.

In making the commercial forms of coils and resistances which I have illustrated as spread out in a triangular figure in Fig. 1 I preferably place both coils M and M′ on one core end to end, so that their inductive effects shall not be impaired, and in most cases I also place the resistances N and N′ on the same structure, making one magnet-coil to handle, with four terminals *m m′ n n′*, connected as shown in Fig. 2. The line-wires go to the outer terminals and the receiver is connected across the inner pair. I thus produce a high efficient and compact organization for my purpose.

Having thus described my invention, what I claim, and desire to secure by Letters Patent, is—

1. In a telephone-exchange system, a central station and a subscriber's station with a line-circuit inter-connecting them, a source of current for the line at the central station, a telephone receiver and transmitter at the subscriber's station and a Wheatstone bridge circuit connection for the receiver, having its alternate arms containing inductive resistance, those intermediate thereof non-inductive resistance, the receiver in the bridge-wire, the extremities of the bridge to line, and the transmitter in series with the line and bridge, whereby battery-current may flow through the transmitter in considerable volume without producing any difference of potential across the terminals of the receiver, while voice-currents produced in the line will be forced practically all through the bridge-wire and the receiver.

2. In a telephone-exchange system, a subscriber's station and a central station with a line-circuit interconnecting them, a source of current for the line at the central station, a telephone receiver and transmitter at the subscriber's station, and circuit connections therefor so arranged that the entire supply of current will flow through the transmitter while the receiver will be connected between points of equal potential for constant electromotive force on the line, but unequal for fluctuating electromotive forces.

3. A telephone-circuit comprising in operation instrumentalities arranged in the following manner; two stations with a line-circuit extending between them, a continuous current source in a bridge of the said line circuit so as to furnish current to both stations in parallel, and a telephone set at each station including a receiver in a Wheatstone bridge balanced for continuous current but unbalanced for fluctuating currents, and a transmitter in series with the line and bridge.

4. In a telephone-exchange system, a central station and a subscriber's station with a line-circuit interconnecting them, a source of current connected to the line at the central station, a telephone transmitter and receiver at the substation, the transmitter in series with the line, and conductively-continuous balanced-circuit connections whereby the receiver will have its terminals maintained at the same or substantially the same potential for continuous current in the line, but not for fluctuating currents, substantially as described.

5. In a telephone-exchange system, a central station, a subscriber's station and a line interconnecting them, a source of continuous current connected to the line at the central station, a transmitter at the substation connected to the line to derive operating current therefrom, a Wheatstone bridge also at the substation having its terminals connected to the line in series with the transmitter, and a receiver in the neutral or bridge wire, together with means whereby for steady electromotive forces or changing forces of low frequency the bridge remains balanced and no current will pass through the receiver, but for high-frequency changing or alternating forces current will pass through the receiver, substantially as described.

6. In a telephone system, a plurality of subscribers' stations and lines therefor, a common source of current therefor, means to interconnect the lines, a transmitter in series in the line at each substation and a Wheatstone bridge connected to the line also at each substation, a receiver in the neutral wire of each bridge, and means to balance the bridges for continuous currents but not for alternating or changing currents, substantially as described.

7. The combination with an energizing source of electricity at the central office included in the line to furnish current to the substation for conversational purposes, of a circuit at the substation containing two paths, both conductively continuous for steady currents, portions of both being opaque to the passage of voice currents, a telephone-transmitter at the substation in series with both paths, a telephone-receiver in a balanced path composed of those parts of the circuits not opaque to voice-currents, and a signaling-bell, substantially as described.

8. The combination with an energizing source of electricity at the central office included in the line to furnish current for conversational purposes, of parallel paths at the substation both conductively continuous, and each containing a resistance and a choking coil, a transmitter included in the path of the energizing-current, and in series with both paths, a receiver connected across the said two paths between the resistance and the choke-coil in each, and a call-bell at the substation connected when the line is not in use through a steady-current interrupter, substantially as described.

9. A telephone substation apparatus comprising a transmitter, a switch-hook, a receiver, a series connection in the line for the transmitter, and a Wheatstone bridge connection for the receiver, the four arms of the bridge containing equal resistances, but alternate arms containing also impedances, together with a signaling-bell connected to line through a steady-current interrupter when the line is idle, substantially as described.

10. A telephone substation apparatus comprising a transmitter and receiver, and a bridge connection for the latter composed of two coils wound upon an iron core, and two resistances non-inductive in character associated with the coils, the coils and resistances being alternately connected to form the four arms of the bridge, the receiver connected across the points between the resistances and their associated coils, and the transmitter in series with the entire bridge and the line, substantially as described.

11. In a telephone set, the combination with a telephone receiver connected directly with the line wires in a circuit conductive to direct and alternating currents, of a transmitter in such circuit associated with such telephone set, a source of current connected to such line circuit for supplying such transmitter with current for talking purposes, and means for preventing the magnetization of the receiver due to the flow of direct currents in the line.

12. In telephone set, the combination with a receiver conductively connected by a non-inductive circuit directly with the line wires, of a transmitter in such circuit associated with such telephone set, a source of current connected to such line circuit for supplying such transmitter with current for talking purposes, and means for protecting the terminals of the receiver from steady potential differences.

13. In a telephone set, the combination with a receiver connected through non-inductive resistances directly with the telephone line limbs, of a transmitter in such circuit associated with such telephone set, a source of current connected to such line circuit for supplying such transmitter with current for talking purposes, and an equalizing circuit of high impedance serving to prevent the magnetization of the receiver by the flow of direct current in the line circuit.

14. In combination, a telephone line, a signal bell and a condenser serially connected in bridge of the line limbs, a telephone set comprising a transmitter, a receiver, and a switch hook controlling the continuity of the circuit through the transmitter and receiver, means for preventing the magnetization of the receiver due to the flow of steady current in the line, and a two-conductor circuit connecting said telephone set with the telephone line and the bell and condenser in bridge thereof.

15. In a telephone set, the combination with an iron core upon which two coils are cumulatively wound and upon which two resistances are non-inductively laid, said coils being alternately connected in series with said resistances, the terminal brought out from each junction of a resistance with a coil, a receiver connected across one diagonally opposite pair of terminals, a telephone line circuit connected with the other pair of terminals, and a transmitter included in the line.

16. In combination, a telephone line circuit, a transmitter in such circuit, a source of current connected to such circuit for supplying such transmitter with current for talking purposes, two coils cumulatively wound upon a common iron core, the positive terminal of one coil being connected to one limb of the telephone line and the negative terminal of the other coil being connected to the other limb of the telephone line, a telephone receiver included in circuit between the other terminals of the coils, means electrically connecting together the positive terminals of the two coils, and means electrically connecting together the negative terminals of the two coils.

In testimony whereof I affix my signature in presence of two witnesses.

RAY H. MANSON.

Witnesses:
A. J. ROBERTS,
A. C. VICARY.